(12) United States Patent
Palmer

(10) Patent No.: US 8,943,737 B1
(45) Date of Patent: Feb. 3, 2015

(54) FLASHER FISH ATTRACTOR

(76) Inventor: Curtis Palmer, Roseburg, OR (US)

( * ) Notice: Subject to any disclaimer, the term of this patent is extended or adjusted under 35 U.S.C. 154(b) by 56 days.

(21) Appl. No.: 12/930,890

(22) Filed: Jan. 19, 2011

(51) Int. Cl.
*A01K 85/12* (2006.01)

(52) U.S. Cl.
USPC .................................. 43/42.19; 43/4.5

(58) Field of Classification Search
CPC ....... A01K 85/00; A01K 85/12; A01K 91/06; A01K 91/065; A01K 91/08
USPC ............ 43/42.11, 42.13, 42.14, 42.15, 42.16, 43/42.17, 42.18, 42.19, 42.2, 42.21
See application file for complete search history.

(56) References Cited

U.S. PATENT DOCUMENTS

| | | | |
|---|---|---|---|
| 496,441 A * | 5/1893 | Pepper, Jr. ..................... 43/42.2 |
| 2,926,451 A | 3/1960 | Leba | |
| 4,800,669 A * | 1/1989 | Charrow ...................... 43/42.19 |
| D363,113 S | 10/1995 | Hazelquist | |
| 5,970,648 A | 10/1999 | DeRose | |
| D435,628 S | 12/2000 | Lester | |
| 6,279,260 B1 | 8/2001 | Farr | |
| 6,493,984 B1 | 12/2002 | Bechhold | |
| D472,955 S | 4/2003 | Hyneman | |
| 6,591,543 B2 * | 7/2003 | Sabine ......................... 43/42.11 |
| 6,643,975 B1 | 11/2003 | Edwards | |
| 6,655,074 B2 | 12/2003 | Pentland | |
| D495,396 S | 8/2004 | Yamaguchi | |
| 6,880,287 B2 | 4/2005 | Eubanks | |
| D521,103 S | 5/2006 | Franco | |
| 7,216,456 B2 | 5/2007 | Kaariainen | |
| 2009/0100737 A1 * | 4/2009 | Hunter ............................ 43/4.5 |
| 2009/0126256 A1 * | 5/2009 | Gregory ...................... 43/42.09 |
| 2010/0071251 A1 * | 3/2010 | Kaariainen ....................... 43/42 |

* cited by examiner

*Primary Examiner* — Darren W Ark
*Assistant Examiner* — Timothy Schwarz
(74) *Attorney, Agent, or Firm* — Howard Eisenberg, Esq.

(57) ABSTRACT

A device to attract fish that causes streamlined motion of a line or lure when the device is drawn through water. The device contains a channel through which may be inserted a fishing line or a shaft, a multiplicity of arms extending radially from the exterior of the channel, and a multiplicity of blades connected to the arms, wherein the blades extend from the arms in a direction that is substantially parallel to the direction of the channel.

19 Claims, 3 Drawing Sheets

FLASHER FISH ATTRACTOR

FIELD OF THE INVENTION

The present invention pertains to the field of lures used to attract fish and in particular to the use of flashers that oscillate or rotate when drawn through water.

BACKGROUND OF THE INVENTION

Flashers and lures are utilized in fishing to attract fish and to cause a fish to strike and become hooked. Flashers are generally attached to a fishing line distant from the hook between the hook and the fisherman's rod. Flashers function to cause lateral motion of a bait or lure as the flasher and the bait or lure are drawn through the water. Additionally, flashers often have shiny surfaces which attracts fish. Lures are attached to a fishing line together with the hook and, like flashers, are used to attract fish. Lures, like flashers, often have shiny surfaces to attract fish. Generally, both flashers and lures typically cause erratic movement of the line and lure when drawn through the water and, thereby mimic the movements of wounded fish.

Typically, flashers and lures include blades that spin when pulled through the water and which serve to attract fish. The blades are rotatably attached to the flasher or lure and thus are capable of free movement. This loose attachment of the blades increases the eccentric motion of the line and is believed to aid in attracting fish.

Based on his experience in fishing, the present inventor believes that such eccentric motion of a line, not only is not necessary to attract fish, but also causes excessive drag on the line when the line is drawn through the water. Therefore, a significant need exists for a flasher and lure that creates a more streamlined path as it travels in the water.

DESCRIPTION OF THE INVENTION

In one embodiment, the invention is a flasher device for attracting fish that oscillates or rotates when drawn through the water. The flasher device contains a channel through which may be inserted a fishing line or a shaft, a multiplicity of arms extending radially from the exterior of the channel, and a multiplicity of blades connected to the arms, wherein the blades extend from the arms in a direction that is substantially parallel to the direction of the channel.

Figure 1:
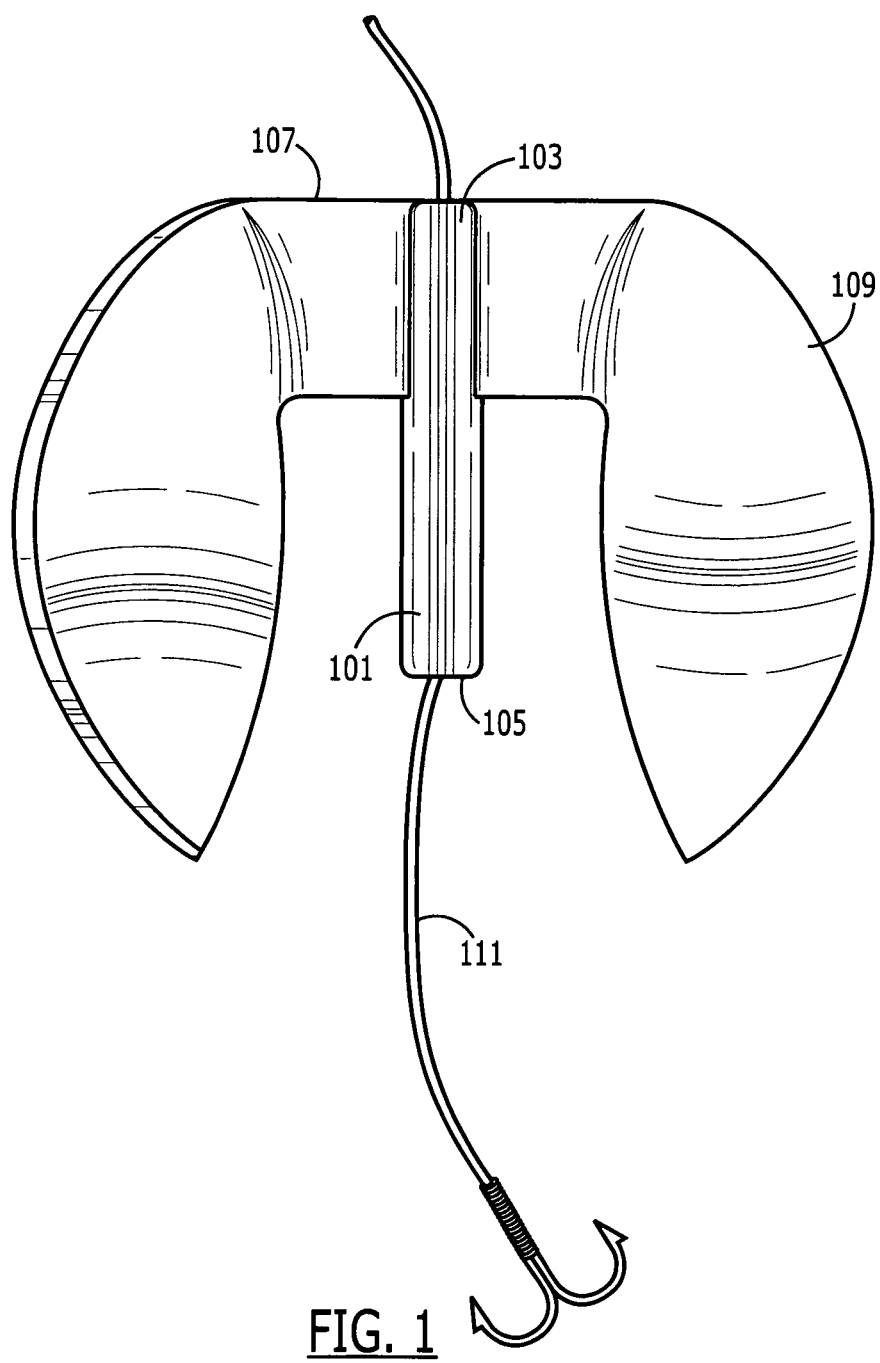
FIG. 1 is a diagrammatic representation of a preferred embodiment of the device of the application.

A preferred embodiment of the device of the invention is shown in FIG. 1. According to this embodiment, the device includes a tubular channel 101 having proximal 103 and distal 105 ends. The channel is connected, preferably rigidly, to a multiplicity of arms 107 that extend outward radially from the channel. The arms are connected, preferably rigidly, to blades 109 that extend in a direction that is substantially parallel to the direction from the proximal to the distal ends of the channel. A flexible or inflexible line or shaft 111 may course through the channel and extend beyond the proximal and or distal ends of the channel.

In a preferred embodiment, the arms and blades are arranged symmetrically in the device. That is, if the device contains two arms, the device is laterally symmetrical with respect to the arms and, if the device contains more than two arms, the device is radially symmetrical with respect to the arms.

The channel is a passageway through which may be inserted a fishing line or a wire or metal shaft, such as the shaft of a lure such as a spinner. The diameter of the channel, therefore, must be of a size that is sufficient to accommodate a fishing line or the shaft of a lure and should be sufficiently wide so that the flasher is able to rotate freely on the line or shaft. Generally, the internal diameter of the channel may be from 0.005 inches, which will accommodate very low test fishing lines, to 0.25 inches or more, which will accommodate large fishing lines and the shafts of large fishing lures. Preferably, the internal diameter of the channel is between 0.02 inches to 0.1 inches in diameter.

Figure 2:
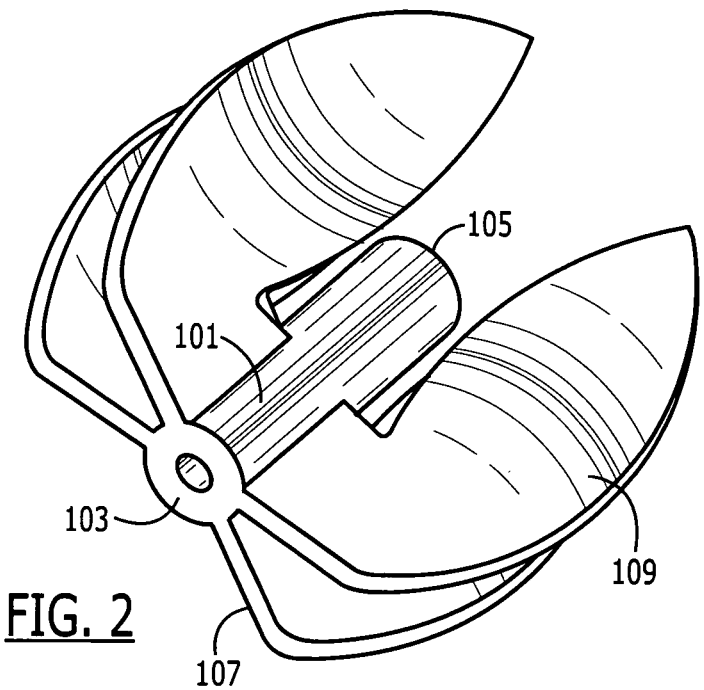
FIG. 2 is a diagrammatic representation of the device in which more than two arms are present.
Figure 3:
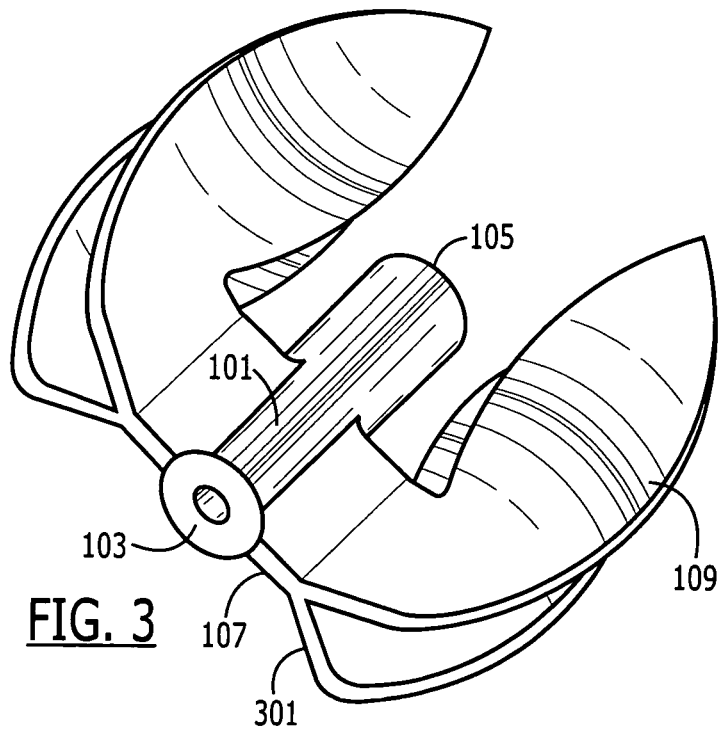
FIG. 3 is a diagrammatic representation of the device which the arms are compound.

A multiplicity of arms are connected to and extend radially outward from the exterior of the channel. Preferably, but not necessarily, the arms are situated so as to be evenly spaced around the channel. Thus, for example, if the device contains two arms, the arms preferably are situated at locations around the channel separated by 180°. If there are three arms, the arms preferably are situated at locations around the channel separated by 120° or by three angles totaling 360°. If there are four arms, the arms preferably are situated at locations around the channel separated by 90° or by four angles totaling 360°. The arms may be simple, as shown in FIG. 2, or may be compound, as shown in FIG. 3. That is, the arms may branch to contain a plurality of extensions 301.

Preferably, but not necessarily, the direction of the arms as they radiate from the channel is perpendicular to the direction of the channel. However, if desired, the direction of the arms from the channel relative to the direction of the channel may be more or less than 90°. If desired, the arms may extend upward as they radiate from the channel or may extend downward. Additionally, one or more of the arms may extend upward or perpendicularly from the channel while other arms may extend downward or perpendicularly from the channel. The term "upward" when used in relation to the device or to a portion of the device refers to the direction that is opposite to that from the attachment of the arms to the channel towards the tip of the blades. The term "downward" refers to the direction that is from the attachment of the arms to the channel towards the tip of the blades.

The arm, or the extension of a compound arm, is connected, preferably rigidly, to one or more blades that extend from the arm in a direction that is substantially parallel to the direction of the channel. In this context, the term "substantially parallel" means that the direction of the blade, as it extends from the arm, defines an angle in combination with the direction of the channel between −45° and 45°. Preferably, the angle of the blade and the direction of the channel is between −25° and 25°. More preferably, the angle is between −5° and 5°. Most preferably, the blade and the direction of the channel are essentially parallel, that is the angle is essentially zero, that is less than 5° from parallel.

The length of the blade from the point of its attachment to the arm until the end of the blade distant from the arm is preferably at least as long as the length of the arm from its point of attachment to the channel until the point of attachment of the arm to the blade. Preferably, the blade is at least 1.5 times as long as the arm. More preferably, the blade is at least twice as long as the arm. Most preferably, the blade is more than twice the length of the arm. The maximum length of the blade relative to the arm is considered to be immaterial except that the device will likely become unwieldy if the blades are too long. As a practical matter, in general, the length of the blades should be less than 3 to 5 times the length of the arms, but may be this long or longer if desired.

The shape of the blades may be varied depending on the desire of the user. The blades may be essentially linear or may be polygonal or have a complex geometrical shape, such as that of a teardrop or curvilinear shape. The blades may be planar or not planar. In a preferred embodiment, the blades have a curved shape such as is found in a propeller or fan blade.

The device may be a unitary device and may be made by any method by which such devices may be made. The device may be made of any rigid material, such as a metal, a plastic, a ceramic, or a composite. Alternatively, the device may be other than a unitary device. For example, the channel section of the device may be made of one material, such as a plastic, and the arms and blades of the device may be made of a different material, such as a metal, or vice versa. In this alternative, the various sections of the device may be made separately and then joined together by any suitable method.

Figure 4:
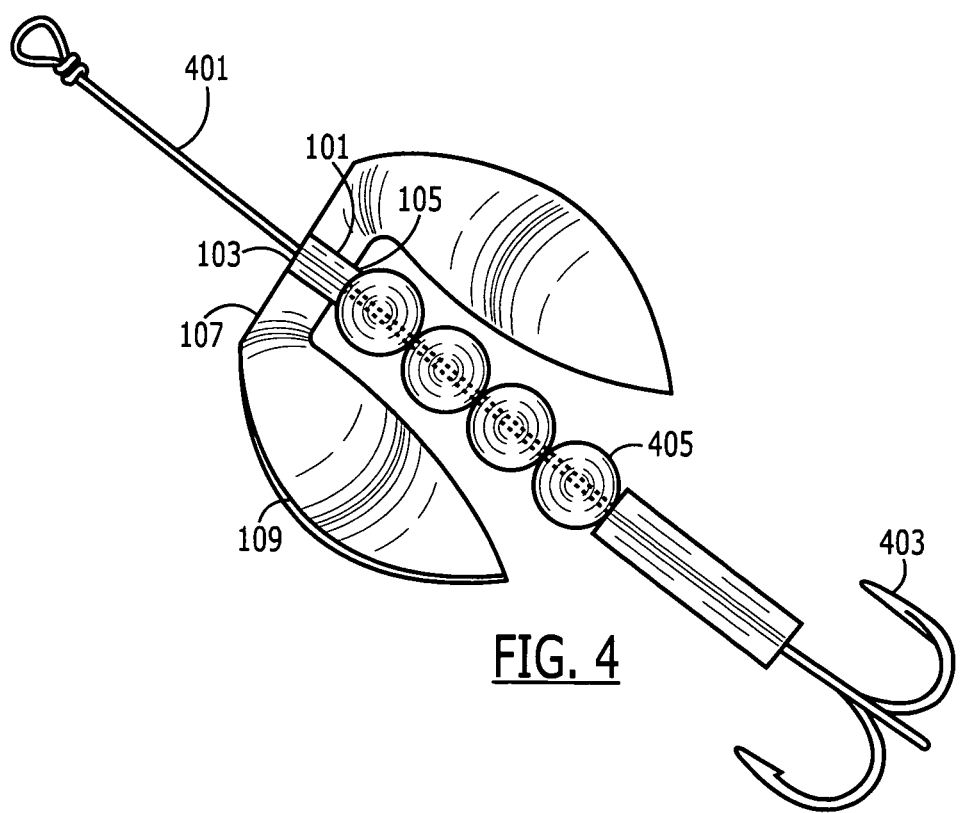
FIG. 4 is a diagrammatic representation of the device of the invention as a spinner fishing lure.

In another embodiment, the device of the application is a spinner lure and, in addition to the device described above, includes a shaft and a hook assembly attached to the shaft. As shown in FIG. 4, the device according to this embodiment includes a channel 101 having proximal 103 and distal 105 ends, which channel is connected to a multiplicity of arms 107 that extend outward radially from the channel, and which arms are connected to blades 109 that extend in a direction that is substantially parallel to the direction from the proximal to the distal ends of the channel. A shaft 401 courses through the channel and extends beyond the proximal and or distal ends of the channel. A hook assembly 403 is connected to the end of the shaft. Optional spacers 405 may be utilized between the hook assembly and the channel.

Also described herein is a method for attracting fish. According to this method, an individual casts by means of a rod and reel a line or lure attached to or containing the device of the invention into a body of water and causes the line or lure to move through the water in an attempt to entice a fish within the body of water to strike the lure and, thereby, to catch the fish.

Further modifications, uses, and applications of the inventions described herein will be apparent to those skilled in the art. It is intended that such modifications be encompassed in the following claims.

The invention claimed is:

1. A method for attracting fish comprising casting a line attached to a flasher device for attracting fish into a body of water, wherein the flasher device comprises a tubular channel having proximal and distal ends, a multiplicity of arms extending radially from the channel, wherein the arms are arranged substantially radially symmetrically around the channel, one or more blades extending from each arm, which blades have an inner and outer edge, wherein the outer edge is spaced a greater distance from a longitudinal axis of the channel than the inner edge in a direction which is transverse to the longitudinal axis of the channel, wherein the junction of the arms and the outer edge of the blades forms a distinct angle, wherein the blades extend from the arms in a direction that is substantially parallel to the direction of the channel, and wherein the blades are held in a spaced relationship to the channel, and causing the line to move through the water, thereby causing the flasher device to move through the water and to spin radially as it moves through the water, and wherein the flasher device is connected to a hook by a length of flexible line between the flasher device and the hook.

2. The method for attracting fish of claim 1 wherein the hook is a component of a lure.

3. The method of claim 1 wherein the blades are rigidly connected to the arms.

4. The method of claim 1 wherein the flasher device comprises two arms.

5. The method of claim 1 wherein the flasher device comprises more than two arms.

6. The method of claim 1 wherein the flasher device comprises arms that are compound.

7. The method of claim 1 wherein the flasher device further comprises a shaft coursing through the channel and a hook connected to the shaft.

8. The method of claim 1 wherein the blades extend from the arms in a direction defines an angle in combination with the direction of the channel between −25° and 45°.

9. The method of claim 8 wherein the angle is between −5° and 15°.

10. The method of claim 1 wherein the blades have a curved propeller shape.

11. A method for attracting fish comprising casting a line attached to a flasher device for attracting fish into a body of water, wherein the flasher device comprises a central member, a multiplicity of arms extending radially from the central member, wherein the arms are arranged radially symmetrically around the central member, and one or more blades extending from each arms, which blades have an inner and outer edge, wherein the outer edge is spaced a greater distance from a longitudinal axis of the central member than the inner edge in a direction which is transverse to the longitudinal axis of the central member, wherein the junction of the arms and the outer edge of the blades forms a distinct and observable angle, the blades extend from the arms in a direction that is substantially parallel to the direction of the central member, and wherein the blades are held in a spaced relationship to the central member, and causing the line to move through the water, thereby causing the flasher device to move through the water and to spin radially as it moves through the water, and wherein the flasher device is connected to a hook by a length of flexible line between the flasher device and the hook.

12. The method for attracting fish of claim 11 wherein the hook is a component of a lure.

13. The method of claim 11 wherein the flasher device comprises two arms.

14. The method of claim 11 wherein the flasher device comprises more than two arms.

15. The method of claim 11 wherein the arms are compound.

16. The method of claim 11 wherein the central member is a tubular channel.

17. The method of claim 11 wherein the blades extend from the arms in a direction that defines an angle in combination with the direction of the central member between minus 25° and plus 45°.

18. The method of claim 17 wherein the angle is between minus 5° and plus 15°.

19. The method of claim 11 wherein the blades have a curved propeller shape.

* * * * *